United States Patent
Zhang et al.

(10) Patent No.: US 12,301,497 B2
(45) Date of Patent: May 13, 2025

(54) METHOD AND APPARATUS FOR UPLINK DATA TRANSMISSION

(71) Applicant: Lenovo (Beijing) Ltd., Beijing (CN)

(72) Inventors: Yuantao Zhang, Dongcheng District (CN); Yi Zhang, Chao Yang District (CN); Hongmei Liu, Changping District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 395 days.

(21) Appl. No.: 17/784,890

(22) PCT Filed: Jan. 3, 2020

(86) PCT No.: PCT/CN2020/070331
§ 371 (c)(1),
(2) Date: Jun. 13, 2022

(87) PCT Pub. No.: WO2021/134797
PCT Pub. Date: Jul. 8, 2021

(65) Prior Publication Data
US 2023/0008945 A1 Jan. 12, 2023

(51) Int. Cl.
*H04L 5/00* (2006.01)
*H04W 72/23* (2023.01)

(52) U.S. Cl.
CPC .......... *H04L 5/0051* (2013.01); *H04L 5/0094* (2013.01); *H04W 72/23* (2023.01)

(58) Field of Classification Search
CPC ... H04L 5/0051; H04L 5/0094; H04L 5/0044; H04W 72/23; H04W 76/27; H04W 74/0833
See application file for complete search history.

(56) References Cited

U.S. PATENT DOCUMENTS

2014/0376484 A1* 12/2014 Park ............... H04W 72/21 370/329
2016/0112994 A1* 4/2016 Wang .............. H04W 72/23 370/329

(Continued)

FOREIGN PATENT DOCUMENTS

CN 110495232 A 11/2019
WO 2019217829 A1 11/2019

OTHER PUBLICATIONS

Huawei, et al., "Further views on Rel-17 small data work area", 3GPP TSG RAN Meeting #85, RP-191833, Newport Beach, US [retrieved Jul. 27, 2022]. Retrieved from the Internet <https://www.3gpp.org/ftp/tsg_ran/TSG_RAN/TSGR_85/Docs>, Sep. 2019, 5 pages.

(Continued)

*Primary Examiner* — Jamal Javaid
(74) *Attorney, Agent, or Firm* — FIG. 1 Patents

(57) ABSTRACT

Embodiments of the present application relate to a method and an apparatus for uplink data transmission. According to an embodiment of the present application, a method can include: transmitting first message for subsequent data transmission from a UE; receiving information indicating a set of demodulation reference signal (DMRS) parameters; and determining at least one DMRS parameter for the subsequent data transmission from the UE based on the received information. Embodiments of the present application provide a technical solution for uplink data transmission for a UE in a RRC INACTIVE state. Accordingly, embodiments of the present application can facilitate the implementation of uplink (UL) data transmission for the UE in the RRC INACTIVE state.

20 Claims, 10 Drawing Sheets

(56) References Cited

U.S. PATENT DOCUMENTS

2019/0159181 A1\* 5/2019 Manolakos ........... H04W 72/23
2019/0297577 A1  9/2019 Lin
2021/0100004 A1\* 4/2021 Yang .................... H04W 72/21

OTHER PUBLICATIONS

PCT/CN2020/070331, "International Preliminary Report on Patentability", PCT Application No. PCT/CN2020/070331, Jul. 14, 2022, 5 pages.
PCT/CN2020/070331, "International Search Report and Written Opinion", PCT Application No. PCT/CN2020/070331, Sep. 28, 2020, 6 pages.
Sony, "Remaining issues on Two-Step RACH Channel Structure", 3GPP TSG RAN WG1 Meeting #99, R1-1912337, Reno, USA [retrieved Jul. 27, 2022]. Retrieved from the Internet <https://www.3gpp.org/ftp/tsg_ran/WG1_RL1/TSGR1_99/Docs>, Nov. 2019, 5 pages.

\* cited by examiner

METHOD AND APPARATUS FOR UPLINK DATA TRANSMISSION

TECHNICAL FIELD

Embodiments of the present application generally relate to wireless communication technology, and in particular to a method and an apparatus for uplink data transmission for user equipment (UE) in a radio resource control (RRC) INACTIVE state.

BACKGROUND

To reduce signaling overhead and save power of UE, new radio (NR) introduces a RRC INACTIVE state. In the RRC INACTIVE state, a UE may not sustain the RRC connection with a base station (BS), but the core network may retain the context of the UE and not release the UE.

In the RRC INACTIVE state, in the case that a UE has data (e.g., sensor data, video surveillance data, and so on) to be transmitted to a BS, the UE may switch to a RRC CONNECTED state first, and then transmit the data in the RRC CONNECTED state. However, switching to the RRC CONNECTED state may bring some signaling overhead to the UE. Especially in the case that the UE has only small amount of data to be transmitted, such signaling overhead seems relatively large compared with the small amount of data.

At least given the above, the industry desires an improved technology for uplink data transmission for UE, especially for UE in a RRC INACTIVE state.

SUMMARY OF THE APPLICATION

Some embodiments of the present application provide a technical solution for uplink data transmission for a UE in a RRC INACTIVE state.

According to some embodiments of the present application, a method may include: transmitting first message for subsequent data transmission from a UE: receiving information indicating a set of demodulation reference signal (DMRS) parameters; and determining at least one DMRS parameter for the subsequent data transmission from the UE based on the received information.

In an embodiment of the present application, the information is a response message in response to the first message, the method further comprising: determining the at least one DMRS parameter based on a relative position of a response signal for the UE in the response message.

In another embodiment of the present application, the information is a response message in response to the first message, and the response message includes a response signal for the UE indicating the at least one DMRS parameter.

In yet another embodiment of the present application, the information is first downlink control information (DCI) for scheduling the subsequent data transmission, and the first DCI indicates the at least one DMRS parameter. The DCI is specific for scheduling data transmission for RRC INACTIVE UEs.

In yet another embodiment of the present application, the information is a response message in response to the first message, and the response message indicates a DMRS parameter group for the UE.

According to some other embodiments of the present application, a method may include: receiving a first message for subsequent data transmission from a UE: determining at least one DMRS parameter for the subsequent data transmission from the UE; and transmitting information indicating a set of DMRS parameters including the at least one DMRS parameter.

Some embodiments of the present application also provide an apparatus, include: at least one non-transitory computer-readable medium having computer executable instructions stored therein, at least one receiver: at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for uplink data transmission for a UE in a RRC INACTIVE state. Accordingly, embodiments of the present application can facilitate the implementation of uplink (UL) data transmission for the UE in the RRC INACTIVE state.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
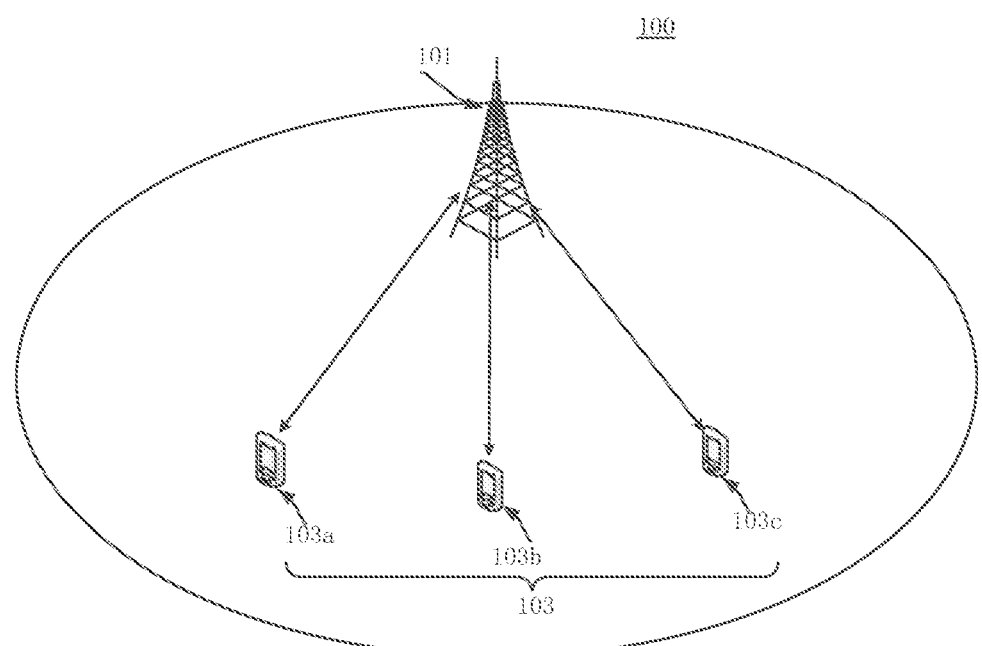
FIG. 1 is a schematic diagram illustrating an exemplary wireless communication system according to some embodiments of the present application.

FIG. 1 is a schematic diagram illustrating an exemplary wireless communication system 100 according to an embodiment of the present application.

As shown in FIG. 1, the wireless communication system 100 can include at least one base station (BS) 101 and at least one UE 103. Although a specific number of BSs 101 and UEs 103, e.g., only one BS 101 and three UEs 103 (e.g., UE 103a, UE 103b, and UE 103c) are depicted in FIG. 1, one skilled in the art will recognize that any number of the BSs 101 and UEs 103 may be included in the wireless communication system 100.

The BS 101 may be distributed over a geographic region, and generally be a part of a radio access network that may include one or more controllers communicably coupled to one or more corresponding BSs 102. In some embodiments of the present application, each BS 102 may also be referred to as an access point, an access terminal, a base, a macro cell, a Node-B, an evolved Node B (eNB), a gNB, a Home Node-B, a relay node, a device, or described using other terminology used in the art.

In some embodiments of the present application, the UE 103 (e.g., UE 103a, UE 103b, or UE 103c) may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, the UE 103 (e.g., UE 103a, UE 103b, or UE 103c) may also be a portable wireless communication device, a smart phone, a cellular telephone, a flip phone, a device having a subscriber identity module, a personal computer, a selective call receiver, or any other device that is capable of sending and receiving communication signals on a wireless network. In some other embodiments of the present application, the UE 103 (e.g., UE 103a, UE 103b, or UE 103c) may be a wearable device, such as a smart watch, a fitness band, an optical head-mounted display, an industrial sensor, a video surveillance, or the like. Moreover, the UE 103 (e.g., UE 103a, UE 103b, or UE 103c) may be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 2:
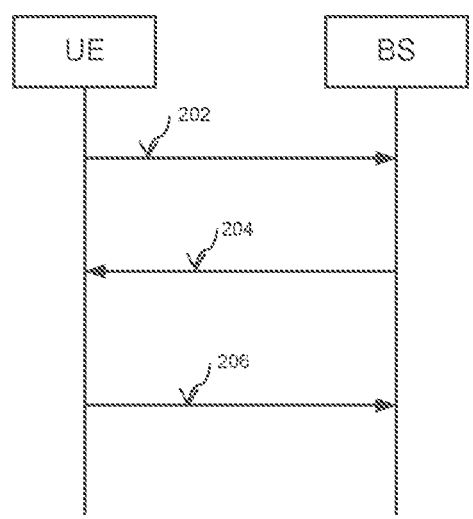
FIG. 2 illustrates a flow chart for uplink data transmission for a UE in a RRC INACTIVE state according to some embodiments of the present application.

FIG. 2 illustrates a flow chart for uplink data transmission for a UE in a RRC INACTIVE state according to some embodiments of the present application.

In some application scenarios, a UE 103 (e.g., UE 103a, UE 103b, or UE 103c) may be in a RRC INACTIVE state. In the case that the UE 103 in the RRC INACTIVE state has uplink data needed to be transmitted to a BS 101. The UE 103 may perform a procedure for uplink data transmission as shown in FIG. 2.

As shown in FIG. 2, a UE 130 (e.g., UE 103a), which is in the RRC INACTIVE state and has uplink data needed to be transmitted to a BS 101, may first transmit a message to the BS 101 before the uplink data transmission at step 202. That is, in the case that a UE 103 has uplink data needed to be transmitted in the RRC INACTIVE state, the UE 103 will transmit a first message for subsequent data transmission to the BS 101. The first message may include a preamble and physical uplink shared channel (PUSCH) transmission. The preamble in the first message may be randomly selected by the UE 103a from a group of preambles configured by the BS 101. The group of preambles may include a number of preambles, for example, sixteen preambles. The PUSCH transmission in the first message may include a contention resolution identity (ID) (e.g., ID of UE 103a). In some embodiment of the present application, the PUSCH transmission in the first message may also include the buffer status report (BSR) of the UE 103a in order to assist the BS 101 to determine whether to turn the UE 103a to a RRC CONNECTED state.

After transmitting the first message, at step 204, the UE 103a may receive a response message from the BS 101. The response message may include a response signal for the UE 103a in response to the first message. The response signal may include the contention resolution identity ID and timing advance information for the UE 103a to synchronize with the BS.

Although the above example uses UE 103a as an example, persons skilled in the art can understand that other UEs 103 (e.g., UE 103b and UE 103c) in the RRC INACTIVE state may also have uplink data to be transmitted to the same BS 101. Therefore, the UE 103b and UE 103c may respectively transmit a first message to the BS 101. That is, from the UE's perspective, each UE 103 in the RRC INACTIVE state which needs to transmit uplink data to the BS 101 may send a first message to the BS 101. From BS's perspective, the BS 101 may receive one or more first messages from one or more UEs 103, respectively. For example, in the case that all of the UE 103a, UE 103b, and UE 103c in the RRC INACTIVE have uplink data needed to be transmitted to the same BS 101, the UE 103a, UE 103b, and UE 103c may respectively transmit a first message to the BS 101. Accordingly, the BS 101 may receive three first messages from UE 103a, UE 103b, and UE 103c for respective uplink data transmission. According to some embodiments of the present application, a plurality of UEs 103, e.g., UE 103a, UE 103b, and UE 103c may transmit their respective first messages on the same physical resource.

Accordingly, according to some embodiments of the present application, the BS 101 may respectively transmit a response message to each of the UEs. Each response message includes a response signal in response to the first message from each of the UEs 103. For example, in the case that all of the UE 103a, UE 103b, and UE 103c respectively transmit a first message to the BS 101, the BS 101 may transmit three response messages, each including a response signal for the UE 103a, UE 103b, and UE 103c. According to some other embodiments of the present application, the BS 101 may transmit a response message including all response signals in response to the first message from each of the UEs 103. For example, in the case that all of the UE 103a, UE 103b, and UE 103c respectively transmit a first message to the BS 101, the BS 101 may transmit a response message including three response signals respectively for the UE 103a, UE 103b, and UE 103c.

According to some other embodiments of the present application, the response message may include the response signals for the UEs which transmit the first messages on the same physical resource. For example, the UE 103a, UE 103b, and UE 103c can respectively transmit a first message to the BS 101, wherein the UE 103a and UE 103b transmit the first message on the same physical resource while the UE 103c transmits its first message on another physical resource. Accordingly, the response message may include the response signals for the 103a and the UE 103b. For the UE 103c, the BS may transmit another response message to it.

After receiving the response message, at step 206, the UE 103, e.g., UE 103a may transmit the uplink data (i.e., subsequent data transmission) to the BS. According to some embodiments of the present application, the subsequent data transmission from the UE 103a may be small data transmission, e.g., traffic from wearables (e.g., periodic positioning information etc.), information from sensors (e.g., industrial wireless sensor networks that transmit temperature, pressure values periodically or in an event triggered manner etc.), and smart meters and smart meter networks sending periodic meter values, in which the packet size is typically small and maybe lower than 1 mega-bits to several mega-bits. The small data transmission may also be referred to as small packet transmission. For the subsequent data transmission being small data transmission, the BS 101 needs not to turn the UE 103, e.g., UE 103a to the RRC CONNECTED state. In other words, during the procedure in FIG. 2, the UE 103a can remain in the RRC INACTIVE state to save signaling overhead and power.

Both the first message transmission and subsequent data transmission are based on at least one DMRS parameter. The at least one DMRS parameter may include at least one of a DMRS port and a DMRS sequence. For example, when transmitting the first message, the UE 103a may select at least one DMRS parameter for the PUSCH transmission in the first message. According to some embodiments of the present application, the at least one DMRS parameter may be deduced from the selected preamble in the first message. For example, each preamble in the group of preambles may have a mapping relationship with a DMRS port and a DMRS sequence. According to an embodiment of the present application, the preambles in the group of preambles may be mapped to the DMRS port and a DMRS sequence in the increasing order of the DMRS ports firstly, followed by the increasing order of the DMRS sequences.

Figure 3:
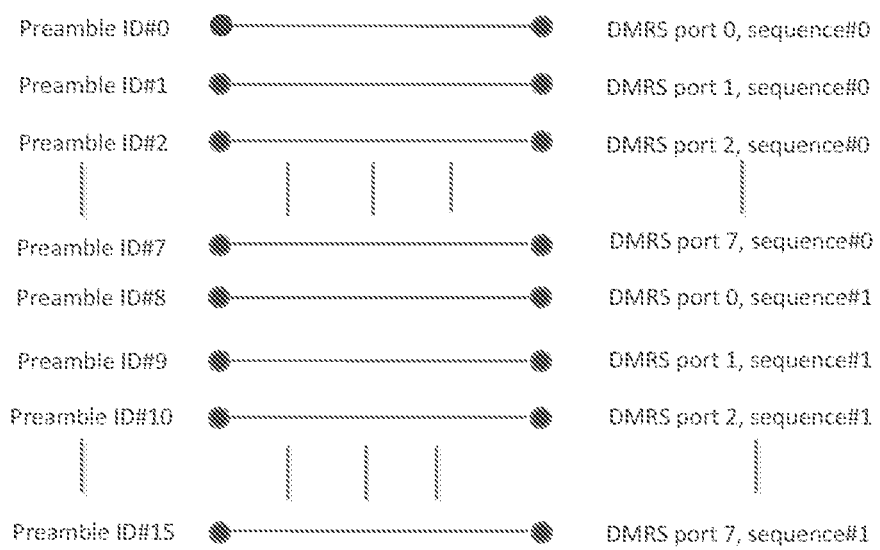
FIG. 3 illustrates a mapping scheme between a group of preambles and a DMRS parameter pool according to some embodiments of the present application.

For example, FIG. 3 illustrates a mapping scheme between a group of preambles and a DMRS parameter pool according to some embodiments of the present application.

As shown in FIG. 3, the group of preambles may include sixteen preambles represented by preamble ID #0, preamble ID #1, preamble ID #2, preamble ID #3, preamble ID #4, preamble ID #5, preamble ID #6, preamble ID #7, preamble ID #8, preamble ID #9, preamble ID #10, preamble ID #11, preamble ID #12, preamble ID #13, preamble ID #14, preamble ID #15. The DMRS parameter pool may include eight orthogonal DMRS ports, respectively represented by DMRS port 0, DMRS port 1, DMRS port 2, DMRS port 3, DMRS port 4, DMRS port 5, DMRS port 6, DMRS port 7; and two DMRS sequences, respectively represented by sequence #0 and sequence #1.

Referring to FIG. 3, starting from preamble ID #0, the preambles in the group of preambles may be mapped to the DMRS port and the DMRS sequence in an increasing order of increasing the order of the DMRS ports firstly, and then increasing the order of the DMRS sequences. For example, preamble ID #0 may be mapped to DMRS port 0 and sequence #0, preamble ID #1 may be mapped to DMRS port 1 and sequence #0, preamble ID #2 may be mapped to DMRS port 2 and sequence #0, preamble ID #7 may be mapped to DMRS port 7 and sequence #0, preamble ID #8 may be mapped to DMRS port 0 and sequence #1, preamble ID #9 may be mapped to DMRS port 1 and sequence #1, preamble ID #10 may be mapped to DMRS port 2 and sequence #1, . . . , and preamble ID #15 may be mapped to DMRS port 7 and sequence #1. Persons skilled in the art can understand that sixteen preambles, eight DMRS ports, and two DMRS sequences are only for illustrative purpose. Other numbers of preambles, DMRS ports, and DMRS sequences can also be used according to some embodiments of the present application.

The DMRS ports may be distributed in a physical resource block (PRB). For example, FIG. 4 illustrates a distribution scheme for the DMRS ports in a PRB according to some embodiments of the present application.

Figure 4:
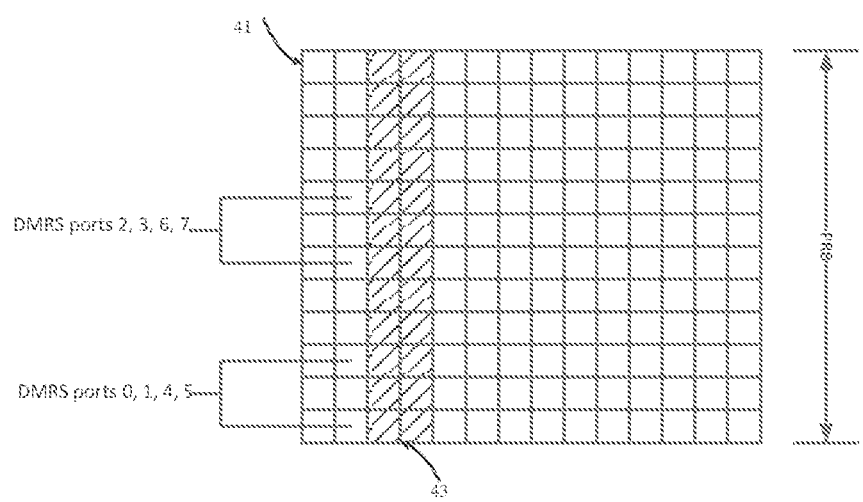
FIG. 4 illustrates a distribution scheme for DMRS ports in a PRB according to some embodiments of the present application.

As shown in FIG. 4, a PRB may include a plurality of resource elements (REs) 41. Reference sign "43" may refer to DMRS in a PRB. Referring to FIG. 4, it shows how to distribute the eight DMRS ports in FIG. 3 in a PRB. For example, DMRS ports 2, 3, 6, and 7 included in a code division multiplexing (CDM) group may be distributed to the same physical resource including four REs 41 as shown in FIG. 4. DMRS ports 0, 1, 4, and 5 included in another CDM group may be distributed in the same physical resource including another four REs 41 as shown in FIG. 4. Although DMRS ports 0, 1, 4, and 5 are distributed in the same resource and DMRS ports 2, 3, 6, and 7 are distributed in the same resource. The eight DMRS port are orthogonal to each other.

As stated above, when transmitting the first message, the UE may randomly select a preamble from a group of preambles (e.g., a group including 16 preambles). That is, two or more UEs may select the same preamble or different preambles but mapped to the same DMRS port. Two or more UEs selecting the same preamble means that they also select the same DMRS port and DMRS sequence, which will cause the non-orthogonal DMRS parameters among these UEs. Moreover, selecting different preambles may also lead to selecting the same DMRS port with different DMRS sequences. In this case, the two or more UEs still do not have non-orthogonal DMRS parameters, and different DMRS sequences may not be clearly distinguished by the BS 101 due to DMRS sequences being non-orthogonal between each other.

It is well known in the art that the channel estimation performance with non-orthogonal DMRS parameters would be poorer than that with orthogonal DMRS parameters. Thus, reusing the same DMRS port and sequence determined for the first message for the subsequent data transmission means that non-orthogonal DMRS parameters for the first message may be used for the subsequent data transmission. As a result, the poor channel estimation performance with non-orthogonal DMRS parameters would impact the transmission efficiency of the subsequent data transmission, e.g., resulting in higher retransmission rate or lower modulation coding scheme (MCS). Furthermore, such reuse scheme may also cause higher DMRS overhead, especially in the case that two or more UEs select the DMRS ports in different CDM groups while the number of the UEs is less than that of the DMRS ports in one CDM group. In such case, the REs (e.g. the eight REs in FIG. 4) for the different CDM groups are fully occupied.

Embodiments of the present application can provide technical solutions at least solving the above technical problems, which may improve channel estimation performance for uplink data transmission as well as saving the DMRS overhead for uplink data transmission. More details on the embodiments of the present application will be illustrated in the following text in combination with the appended drawings.

Figure 5:
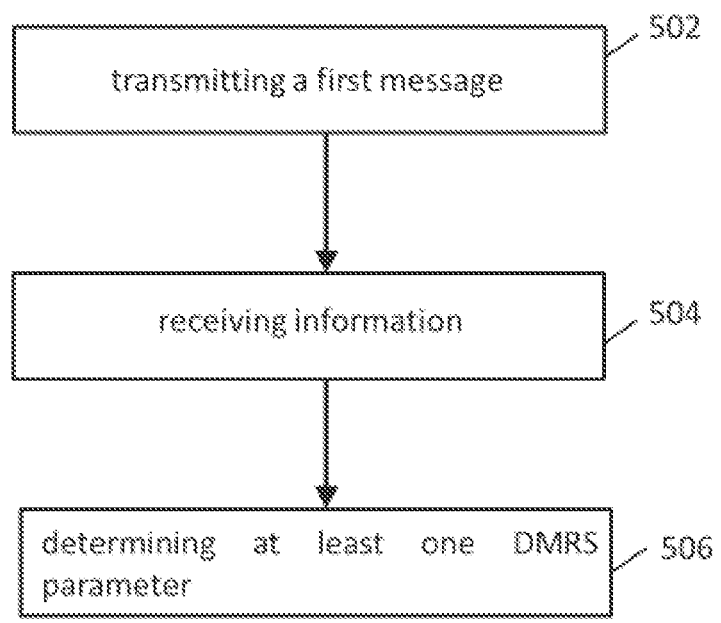
FIG. 5 illustrates a method for uplink data transmission according to some embodiments of the present application.

FIG. 5 illustrates a method for uplink data transmission according to some embodiments of the present application. The method may be performed by a UE 103 in the RRC INACTIVE state, for example, the UE 103a, the UE 103b, or the UE 103c as shown in FIG. 1.

As shown in FIG. 5, the UE 103, for example, the UE 103a in the RRC INACTIVE state may have uplink data needed to be transmitted, i.e., subsequent data transmission to a BS 101. At step 502, the UE 103 may transmit a first message to the BS 101. According to some embodiments of the present application, the subsequent data is transmitted from the UE 103 in a RRC INACTIVE state. In this case, the subsequent data transmission may also be referred to as small data transmission.

According to some embodiments of the present application, the first message may include a preamble and a PUSCH transmission. The preamble in the first message may be randomly selected by the UE 103 from a group of preambles configured by the BS 101. The group of preambles may include a number of preambles, for example, sixteen preambles. The PUSCH transmission in the first message may include a contention resolution ID, which is the ID of a UE 103 transmitting the first message, e.g., the ID of UE 103a. In some embodiment of the present application, the PUSCH transmission in the first message may also include the buffer state report (BSR) of the UE 103 in order to assist the BS 101 to determine whether to turn the UE 103 to a RRC CONNECTED state. As stated above, in the case that the subsequent data transmission for UE 103 is a small data transmission, the BS 101 may determine not to turn the UE 103 to a RRC CONNECTED state.

After transmitting the first message, at step 504, the UE 103, e.g., the UE 103a may receive information indicating a set of DMRS parameters. The set of DMRS parameters may include at least one DMRS parameter for the UE 103a. According to some embodiments of the present application, the set of DMRS parameters may include at least one DMRS parameter for the UE 103a and at least one DMRS parameter for one or more other UEs transmitting the first messages to the BS 101, e.g., UE 103b and/or UE 103c (for simplicity and clarity, assuming all first messages to the BS can be successfully received by the BS, hereinafter the same). In an embodiment of the present application, besides at least one DMRS parameter for the UE 103a, the set of DMRS parameters may also include at least one DMRS parameter for one or more other UEs, e.g., UE 103b and/or UE 103c, which transmit the first messages on the same physical resource as the UE 103a. The at least one DMRS parameter may include at least one of a DMRS port and a DMRS sequence for the corresponding UE 103, e.g., UE 103a.

After receiving the information indicating a set of DMRS parameters, at step 506, the UE 103, e.g., the UE 103a may determine at least one DMRS parameter for the subsequent data transmission from the UE 103a based on the received information.

According to some embodiments of the present application, the information may be a response message in response to the first message. The response message may include a response signal for the UE 103. The response signal for the UE 103 may include the contention resolution ID in the first message and timing advance information for the UE 103 to synchronize with the BS 101. In some embodiments of the present application, the response message may include response signal(s) for all the UE(s) 103 which transmit the first messages. For example, in the case that the UE 103a, UE 103b, and UE 103c respectively transmit a first message to the BS 101, the response message may include three response signals respectively for the UE 103a, UE 103b, and UE 103c. Each response signal may include the contention resolution ID and timing advance information for the corresponding UE 103. After receiving the response message, the UE 103 may determine the at least one DMRS parameter based on a relative position of its response signal in the response message.

Figure 6:
FIG. 6 illustrates a mapping scheme between positions of response signals in a response message and a DMRS parameter pool according to some embodiments of the present application.

For example, FIG. 6 illustrates a mapping scheme between positions of response signals in a response message and a DMRS parameter pool according to some embodiments of the present application. The mapping scheme may be configured by the BS 101 to the UEs 103, e.g., the UE 103a, UE 103b and UE 103c.

As shown in FIG. 6, the DMRS parameter pool may include eight orthogonal DMRS ports, respectively represented by DMRS port 0, DMRS port 1, DMRS port 2, DMRS port 3, DMRS port 4, DMRS port 5, DMRS port 6, DMRS port 7; and two DMRS sequences, respectively represented by sequence #0 and sequence #1. These DMRS parameters may correspond to sixteen positons of sixteen response signals in a response message. The sixteen positons may represented by positon #1, positon #2, positon #3, positon #4, positon #5, positon #6, positon #7, positon #8, positon #9, positon #10, positon #11, positon #12, positon #13, positon #14, positon #15, and positon #16. Positon #1 to position #16 may refer to 16 positions ordered based on the distance from the respective response signal in the response message to a header of the response message. For example, position #1 may refer to a response signal located in a position, which is the closest to a header of the response signal while positon #16 may refer to a response signal located in a position which is the farthest to the header of the response signal.

Referring to FIG. 6, starting from positon #1, the positions with increasing order may be mapped to the DMRS port and the DMRS sequence in the increasing order of the DMRS ports firstly, followed by the increasing order of the DMRS sequences. For example, positon #1 may be mapped to DMRS port 0 and sequence #0, positon #2 may be mapped to DMRS port 1 and DMRS sequence 0, positon #3 may be mapped to DMRS port 2 and sequence #0, . . . , positon #8 may be mapped to DMRS port 7 and sequence #0, positon #9 may be mapped to DMRS port 0 and sequence #1, positon #10 may be mapped to DMRS port 1 and sequence #1, positon #11 may be mapped to DMRS port 2 and sequence #1, . . . , and positon #16 may be mapped to DMRS port 7 and sequence #1. Persons skilled in the art can understand that sixteen positions, eight DMRS ports, and two DMRS sequences are only for illustrative purpose. Other numbers of positions, DMRS ports, and DMRS sequences can also be used according to some embodiments of the present application.

Figure 7:
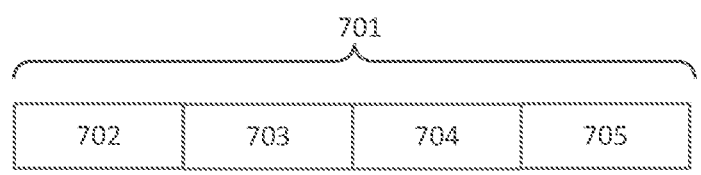
FIG. 7 illustrates a schematic structure for a response message according to some embodiments of the present application.

FIG. 7 illustrates a response message according to an embodiment of the present application. As shown in FIG. 7, in the case that all of the UE 103a, UE 103b, and UE 103c respectively transmit a first message to the BS 101, the response message may include three response signals respectively for the three UE 103. For example, the response message 701 in FIG. 7 may include a header 702, a response signal 703, a response signal 704, and a response signal 705. The response signals 703-705 may have positon #1, positon #2, positon #3, respectively, according to their distances to the header 701. The response signals 703-705 can be configured respectively for the UE 103b, UE 103a, and UE 103c. Since the response signal for the UE 103a is in a position with positon #2, the UE 103a will determine DMRS port 1 and sequence #0 for the subsequent data transmission from the UE 103*a* according to the mapping scheme in FIG. 6. Similarly, the UE 103*b* may determine DMRS port 0 and sequence #0 for the subsequent data transmission from the UE 103*b* according to the mapping scheme in FIG. 6, the UE 103*c* may determine DMRS port 2 and sequence #0 for the subsequent data transmission from the UE 103*c* according to the mapping scheme in FIG. 6. Persons skilled in the art can understand that three signals are only for illustrative purpose. The response message may include response signals for all of the UEs 103 which transmit the first messages.

According to some embodiments of the present application, the information may be a response message in response to the first message. The response message may include a response signal for the UE 103 that transmits the first message. The response signal for the UE 103 may indicate the at least one DMRS parameter. The response signal may also include the contention resolution identity ID and timing advance information for the UE 103 to synchronize with the BS 101. In some embodiments of the present application, the response message may include response signal(s) for all the UEs 103 which transmit the first messages to the BS 101. For example, in the case that all of the UE 103*a*, UE 103*b*, and UE 103*c* respectively transmit a first message to the BS 101, the response message may include three response signals respectively for the UE 103*a*, UE 103*b*, and UE 103*c*. Each of the response signals may indicate at least one DMRS parameter for the corresponding UE 103.

According to some embodiments of the present application, the information may be first downlink control information (DCI) for scheduling the subsequent data transmission from the UE 103*a*. The first DCI indicates the at least one DMRS parameter for the subsequent data transmission from the UE 103*a*. According to an embodiment of the present application, the first DCI may be specific for the UE 103*a*.

According to some embodiments of the present application, the information may be a response message in response to the first message. The response message may indicate a DMRS parameter group for a group of UEs 103, e.g., the UE 103*a*, UE 103*b* and UE 103*c*. The group of UEs 103 may transmit respective first messages on the same physical resource. According to an embodiment of the present application, the DMRS parameter group may be indicated in the header of the response message as shown in FIG. 7. According to another embodiment of the present application, the DMRS parameter group may be indicated in each response signal for each UE of the group of UEs as shown in FIG. 7.

The DMRS parameter group may be obtained by dividing a DMRS parameter pool. For example, a DMRS parameter pool may be divided into at least one DMRS parameter group, and each DMRS parameter group may include at least one pair of DMRS port and DMRS sequence. The number of the pairs of DMRS port and DMRS sequence in each DMRS parameter group may be the same as or different from each other. Each pair of DMRS port and DMRS sequence in a DMRS parameter group may be orthogonal to each other. The at least one DMRS parameter group may be configured by the BS 101 to the UEs 103, e.g., the UE 103*a*, UE 103*b*, and UE 103*c*. Therefore, the response message may indicate which DMRS parameter group of the at least one DMRS parameter group is used for the group of UEs. After receiving the response message, at step 506, the UE 103 may determine the at least one DMRS parameter from the DMRS parameter group.

For example, the DMRS parameter pool may include eight DMRS ports and two DMRS sequences. The DMRS parameter pool may be divided into two DMRS parameter groups, the first DMRS parameter group may include eight pairs of DMRS port and DMRS sequence, i.e., DMRS port 0 and sequence #0, DMRS port 1 and sequence #0, DMRS port 2 and sequence #0, DMRS port 3 and sequence #0, DMRS port 4 and sequence #0, DMRS port 5 and sequence #0, DMRS port 6 and sequence #0, DMRS port 7 and sequence #0. The second DMRS parameter group may include eight pairs of DMRS port and DMRS sequence, i.e., DMRS port 0 and sequence #1, DMRS port 1 and sequence #1, DMRS port 2 and sequence #1, DMRS port 3 and sequence #1, DMRS port 4 and sequence #1, DMRS port 5 and sequence #1, DMRS port 6 and sequence #1, DMRS port 7 and sequence #1. In this example, the two DMRS parameter groups may be configured by the BS 101 to the UEs 103, e.g., UE 103*a*, UE 103*b*, and UE 103*c*.

In the case that a plurality of UEs 103, e.g., the UE 103*a* and UE 103*b* transmit the first message on the same physical resource, the response message may include a plurality of response signals, e.g., two response signals for the UE 103*a* and UE 103*b*. Moreover, in the case that the response message indicates that the second DMRS parameter group may be used for the UE 103*a*, the UE 103*a* may determine at least one DMRS parameter from the second DMRS parameter group based on the relative position of response signal for the UE 103*a* in the response message. For example, in the case that the response signal for the UE 103*a* is at position #1 of the response message, the UE 103*a* may determine DMRS port 0 and sequence #1 from the second DMRS parameter group. In the case that the response signal for the UE 103*a* is at position #2 of the response message, the UE 103*a* may determine DMRS port 1 and sequence #1 from the second DMRS parameter group.

According to some embodiments of the present application, the UE 103 may receive a group DCI with a group radio network temporary identifier (RNTI) for scheduling the subsequent data transmission from the UE 103. The group DCI with the group RNTI is for a group of UEs 103, wherein the group of UEs 103 may transmit respective first messages on the same physical resource. According to an embodiment of the present application, the group RNTI may be as the same as a RNTI used for second DCI scheduling a response message in response to the first message. According to another embodiment of the present application, the group RNTI may be determined based on a RNTI used for second DCI scheduling a response message in response to the first message and an offset. For example, the group RNTI may be obtained by adding a specific offset on top of the RNTI used for the second DCI scheduling the response message in response to the first message.

According to some embodiments of the present application, a group DCI can be used to activate a set of uplink resources for transmitting the subsequent data transmissions from a group of UEs. However, the uplink data to be transmitted after the first message may be too large to be carried in the available time-frequency resource one time, and accordingly the entire subsequent data transmission may include a plurality of sub-transmissions. For example, according to some embodiments of the present application, the subsequent data transmission of a UE 103, e.g., the UE 103*a*, or the subsequent data transmissions of the group of UEs 103, e.g., the UE 103*a*, 103*b* and 103*c* may be divided into multiple data blocks. The UE 103*a* may receive a group DCI for a corresponding data block. That is, one data block can be transmitted in one sub-transmission. According to an embodiment of the present application, a UE 103, e.g., UE 103*a* may receive the group DCI used to activate a set of uplink resources for transmitting the subsequent data transmissions from the group of UEs for only one sub-transmission.

Figure 8:
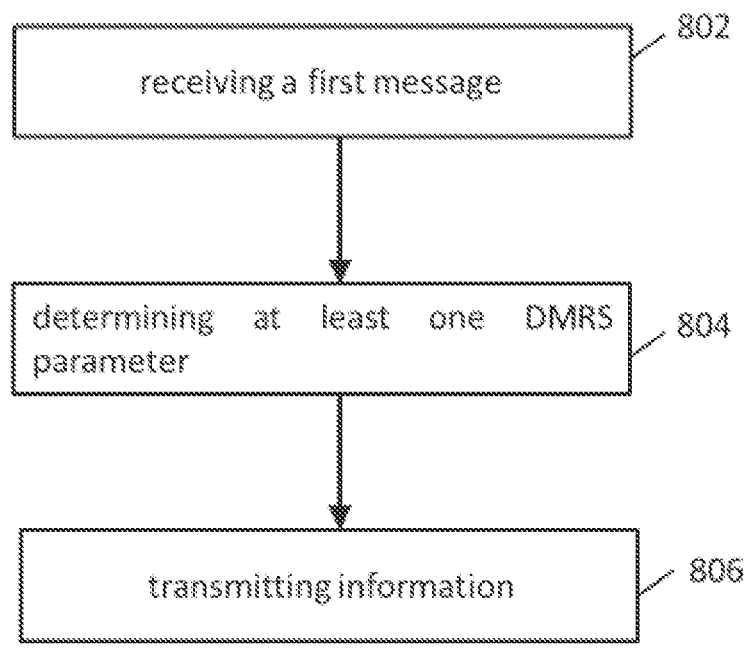
FIG. 8 illustrates a method for uplink data transmission according to some other embodiments of the present application.

FIG. 8 illustrates a method for uplink data transmission according to some other embodiments of the present application. The method may be performed by a BS, for example, the BS 101 as shown in FIG. 1.

As shown in FIG. 8, the BS 101 may receive a first message from a UE 103 (e.g., UE 103a) in a RRC INACTIVE state for subsequent data transmission from the UE 103. According to some embodiments of the present application, the subsequent data transmission from the UE 103 may be transmitted from the UE 103 in a RRC INACTIVE state. In this case, the subsequent data transmission may also be referred to as small data transmission.

According to some embodiments of the present application, the first message may include a preamble and a PUSCH transmission. The preamble in the first message may be randomly selected by the UE 103a from a group of preambles configured by the BS 101. The group of preambles may include a number of preambles, for example, sixteen preambles. The PUSCH transmission in the first message may include a contention resolution ID, which is the ID of a UE 103 transmitting the first message, e.g., the ID of UE 103a. In some embodiment of the present application, the PUSCH transmission in the first message may also include the BSR of the UE 103 in order to assist the BS 101 to determine whether to turn the UE 103 to a RRC CONNECTED state. As stated above, in the case that the subsequent data transmission for UE 103 is a small data transmission, the BS 101 may determine not to turn the UE 103 to a RRC CONNECTED state.

After receiving the first message, at step 804, the BS 101 may determine at least one DMRS parameter for the subsequent data transmission from the UE 103, e.g., the UE 103a. In the case that the BS 101 receives more than one first message from more than one UE, respectively, the BS 101 may determine the at least one DMRS parameter for each UE which transmit the first message. The at least one DMRS parameter may include at least one of: a DMRS port and a DMRS sequence for the corresponding UE103, e.g., UE 103a.

After determining the at least one parameter, at step 806, the BS 101 may transmit information indicating a set of DMRS parameters. The set of DMRS parameters may include the at least one DMRS parameter for the UE 103a. According to some embodiments of the present application, the set of DMRS parameters may include at least one DMRS parameter for the UE 103a and at least one DMRS parameter for one or more other UEs transmitting the first messages to the BS 101, e.g., UE 103b and/or UE 103c (for simplicity and clarity, assuming all first messages to the BS can be successfully received by the BS, hereinafter the same). In an embodiment of the present application, besides at least one DMRS parameter for the UE 103a, the set of DMRS parameters may also include at least one DMRS parameter for one or more other UEs, e.g., UE 103b and/or UE 103c, which transmit the first messages on the same physical resource as the UE 103a According to some embodiments of the present application, the information may be a response message in response to the first message. The response message may include a response signal for the UE 103. The response signal for the UE 103 may include the contention resolution identity ID in the first message from the UE 103 and timing advance information for the UE 103 to synchronize with the BS 101. In some embodiments of the present application, the response message may include response signal(s) for all the UE(s) 103 which transmit the first messages. For example, in the case that the BS receive the first messages from the UE 103a, UE 103b, and UE 103c, respectively, the response message may include three response signals respectively for UE 103a, UE 103b, and UE 103c. Each response signal may include the contention resolution identity ID and timing advance information for the corresponding UE. In these embodiment, the information may indicate the at least one DMRS parameter based on a relative position of a response signal for the UE 103 in the response message as shown in FIGS. 6 and 7.

For example, as shown in FIG. 6, starting from positon #1, the positions with increasing order may be mapped to the DMRS port and the DMRS sequence in the increasing order of the DMRS ports firstly, followed by the increasing order of the DMRS sequences. Moreover, as shown in FIG. 7, the response signal 703 with position #1 is for the UE 103b, the response signal 704 with position #2 is for the UE 103a, and the response signal 705 with position #3 is for the UE 103c. In view of the mapping scheme in FIG. 6 and the response message in FIG. 7, the information may indicate that DMRS port 1 and sequence #0 is for the subsequent data transmission from the UE 103a. Moreover, the information may also indicate that DMRS port 0 and sequence #0 is for the subsequent data transmission from the UE 103b and DMRS port 2 and sequence #0 is for the subsequent data transmission from the UE 103c.

According to some embodiments of the present application, the information may be a response message in response to the first message. The response message may include a response signal for the UE that transmits the first message. The response signal for the UE 103 may indicate the at least one DMRS parameter. The response signal may also include the contention resolution identity ID and timing advance information for the UE 103 to synchronize with the BS 101. In some embodiments of the present application, the response message may also include response signal(s) for all the UE(s) 103 which transmit the first messages to the BS 101. For example, in the case that all of the UE 103a, UE 103b, and UE 103c respectively transmit a first message to the BS 101, the response message may include three response signals respectively for UE 103aE 103b, and UE 103c. Each of the response signals may indicate at least one DMRS parameter for the corresponding UE 103.

According to some embodiments of the present application, the information may be first downlink control information (DCI) for scheduling the subsequent data transmission from the UE 103a, and the first DCI indicates the at least one DMRS parameter for the subsequent data transmission from the UE 103a. According to an embodiment of the present application, the first DCI may be specific for the UE 103a.

According to some embodiments of the present application, the BS 101 may receive respective first message from a group of UEs, e.g., the UE 103a, UE 103b and UE 103c then the BS 101 may indicate a DMRS parameter group for the group of UEs. In these embodiments, the information may be a response message in response to the first message. The response message may indicate a DMRS parameter group for a group of UEs. According to an embodiment of the present application, the DMRS parameter group may be indicated in the header of the response message as shown in FIG. 7. According to another embodiment of the present application, the DMRS parameter group may be indicated in each response signal for each UE of the group of UEs as shown in FIG. 7.

The DMRS parameter group may be obtained by dividing a DMRS parameter pool. For example, a DMRS parameter pool may be divided into at least one DMRS parameter groups, each DMRS parameter group may include at least one pair of DMRS port and DMRS sequence. The number of the pairs of DMRS port and DMRS sequence in each DMRS parameter group may be the same as or different from each other. Each pair of DMRS port and DMRS sequence in a DMRS parameter group may be orthogonal with each other. The BS 101 may configure the at least one DMRS parameter groups to the UEs 103 (e.g., UE 103a, UE 103b, and UE 103c) such that the BS and UEs both know the at least one DMRS parameter groups. On the basis, the response message may indicate which DMRS parameter group of the at least one DMRS parameter groups is used for the group of UEs such that the UE 103 may determine the at least one DMRS parameter from the DMRS parameter group.

For example, the DMRS parameter pool may include eight DMRS ports and two DMRS sequences. These parameters may be divided into two DMRS parameter groups, the first DMRS parameter group may include eight pairs of DMRS port and DMRS sequence, i.e., DMRS port 0 and sequence #0, DMRS port 1 and sequence #0, DMRS port 2 and sequence #0, DMRS port 3 and sequence #0, DMRS port 4 and sequence #0, DMRS port 5 and sequence #0, DMRS port 6 and sequence #0, DMRS port 7 and sequence #0. The second DMRS parameter group may include eight pairs of DMRS port and DMRS sequence, i.e., DMRS port 0 and sequence #1, DMRS port 1 and sequence #1, DMRS port 2 and sequence #1, DMRS port 3 and sequence #1, DMRS port 4 and sequence #1, DMRS port 5 and sequence #1, DMRS port 6 and sequence #1, DMRS port 7 and sequence #1. In this example, the BS 101 may configure the two DMRS parameter groups to the UEs 103 (e.g., UE 103a, UE 103b, and UE 103c) such that the BS and UEs both know the two DMRS parameter groups. On the basis, the response message may indicate which DMRS parameter group of the first DMRS parameter group and the second DMRS group is used for the group of UEs, such that the each UE 103 in the group of UEs may determine the at least one DMRS parameter from the indicated DMRS parameter group based on a position of its response signal in the response message.

According to some embodiments of the present application, for the group of UEs 103 which transmit the first messages on the same physical resource, the BS 101 may transmit a group DCI with a group radio network temporary identifier (RNTI) for scheduling the subsequent data transmissions from the group of UEs 103. According to an embodiment of the present application, the group RNTI may be as the same as a RNTI used for second DCI scheduling a response message in response to the first message. According to another embodiment of the present application, the group RNTI may be determined based on a RNTI used for second DCI scheduling a response message in response to the first message and an offset. For example, the group RNTI may be obtained by adding a specific offset on top of the RNTI used for the second DCI scheduling the response message in response to the first message.

According to some embodiments of the present application, a group DCI can be used to activate a set of uplink resources for transmitting the subsequent data transmissions from a group of UEs. However, the uplink data to be transmitted after the first message may be too large to be carried in the available time-frequency resource one time, and accordingly the entire subsequent data transmission may include a plurality of sub-transmissions. For example, according to some embodiments of the present application, the subsequent data transmission of a UE 103, e.g., the UE 103a, or the subsequent data transmissions of the group of UEs 103, e.g., the UE 103a, 103b and 103c may be divided into multiple data blocks. The UE 103a may receive a group DCI for a corresponding data block. That is, one data block can be transmitted in one sub-transmission. According to an embodiment of the present application, a UE 103, e.g., UE 103a may receive the group DCI used to activate a set of uplink resources for transmitting the subsequent data transmissions from the group of UEs for only one sub-transmission.

Figure 9:
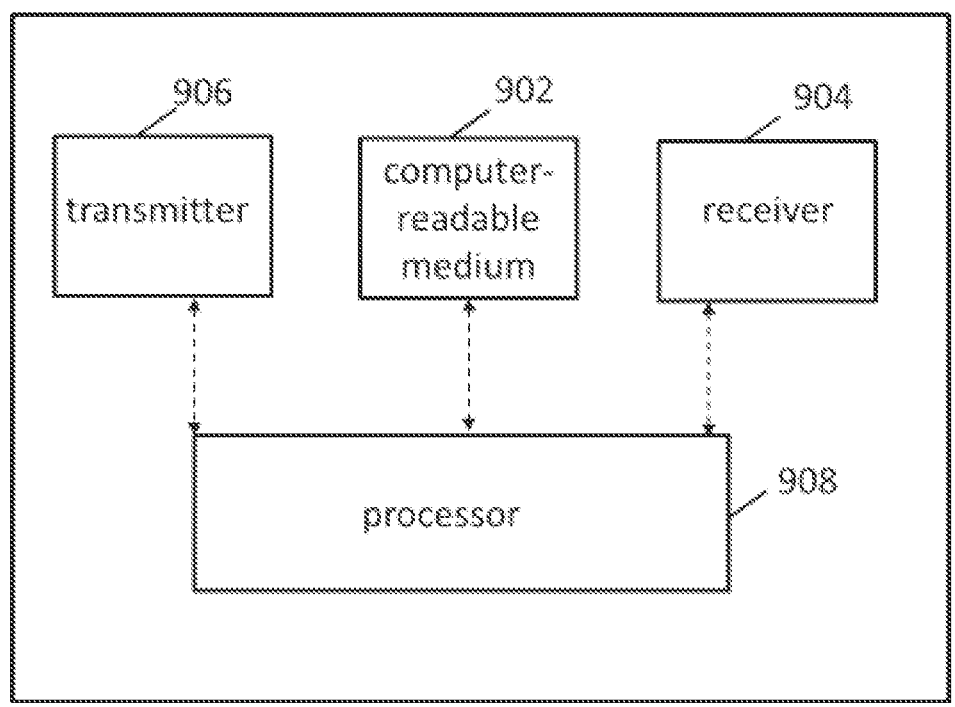
FIG. 9 illustrates a simplified block diagram of an apparatus for uplink data transmission according to some embodiments of the present application.

FIG. 9 illustrates a simplified block diagram of an apparatus 900 for uplink data transmission according to some embodiments of the present application. The apparatus 900 may be a UE 103 (e.g., UE 103a, UE 103b, or UE 103c) as shown in FIG. 1.

Referring to FIG. 9, the apparatus 900 may include at least one non-transitory computer-readable medium 902, at least one receiver 904, at least one transmitter 906, and at least one processor 908. In some embodiment of the present application, at least one receiver 904 and at least one transmitter 906 and be integrated into at least one transceiver. The at least one non-transitory computer-readable medium 902 may have computer executable instructions stored therein. The at least one processor 908 may be coupled to the at least one non-transitory computer-readable medium 902, the at least one receiver 904 and the at least one transmitter 906. The computer executable instructions can be programmed to implement a method with the at least one receiver 904, the at least one transmitter 906 and the at least one processor 908. The method can be a method according to an embodiment of the present application, for example, the method shown in FIG. 5.

Figure 10:
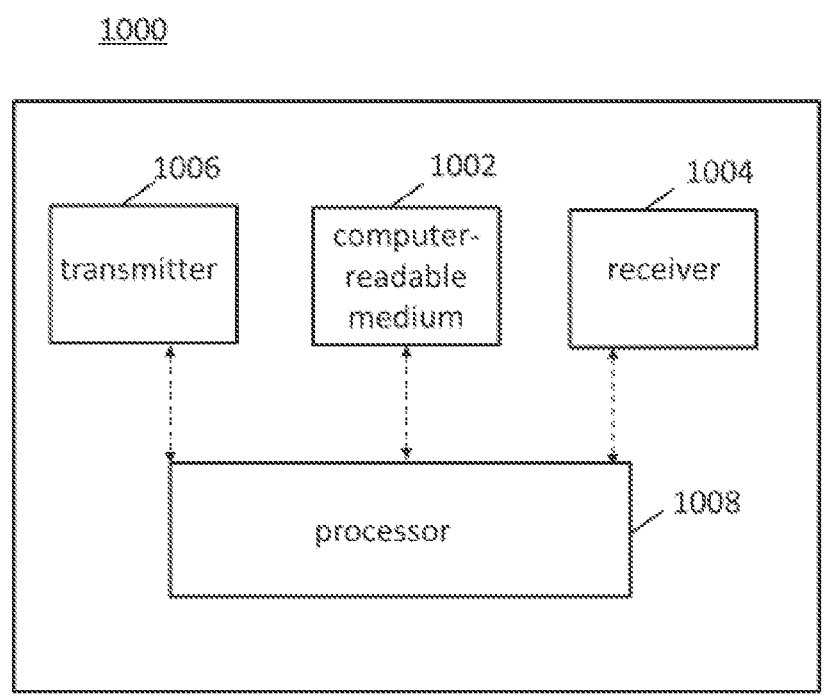
FIG. 10 illustrates a simplified block diagram of an apparatus for uplink data transmission according to some other embodiments of the present application.

FIG. 10 illustrates a simplified block diagram of an apparatus 1000 for a uplink data transmission according to some embodiments of the present application. The apparatus 1000 may be a BS 101 as shown in FIG. 1.

Referring to FIG. 10, the apparatus 1000 may include at least one non-transitory computer-readable medium 1002, at least one receiver 1004, at least one transmitter 1006, and at least one processor 1008. In some embodiment of the present application, at least one receiver 1004 and at least one transmitter 1006 and be integrated into at least one transceiver. The at least one non-transitory computer-readable medium 1002 may have computer executable instructions stored therein. The at least one processor 1008 may be coupled to the at least one non-transitory computer-readable medium 1002, the at least one receiver 1004 and the at least one transmitter 1006. The computer executable instructions can be programmed to implement a method with the at least one receiver 1004, the at least one transmitter 1006 and the at least one processor 1008. The method can be a method according to an embodiment of the present application, for example, the method shown in FIG. 8.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory; EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communication, comprising:
    at least one memory; and
    at least one processor coupled with the at least one memory and configured to cause the apparatus UE to:
        transmit a first message that indicates a subsequent uplink data transmission;
        receive, based at least in part on the first message, a second message that indicates a set of demodulation reference signal (DMRS) parameters, wherein the set of DMRS parameters is associated with respective UEs in a group of UEs comprising the UE, and wherein a same resource associated with the group of UEs is used for one or more respective uplink transmissions comprising the first message; and
        transmit, based at least in part on at least one DMRS parameter of the set of DMRS parameters, the subsequent uplink data transmission.

2. The UE of claim 1, wherein the first message comprises a preamble and physical uplink shared channel (PUSCH) transmission.

3. The UE of claim 1, wherein the at least one DMRS parameter comprises at least one of:
    a DMRS port; or
    a DMRS sequence.

4. The UE of claim 1, wherein the second message is received in response to the first message, and wherein the at least one processor is further configured to cause the UE to determine the at least one DMRS parameter based at least in part on a relative position of a response signal in the second message.

5. The UE of claim 1, wherein the second message is received in response to the first message, and wherein the response second message comprises a response signal indicating the at least one DMRS parameter.

6. The UE of claim 1, wherein the second message comprises downlink control information (DCI) scheduling the subsequent uplink data transmission, and wherein the DCI indicates the at least one DMRS parameter.

7. The UE of claim 6, wherein the DCI is specific to the UE.

8. The UE of claim 1, wherein the second message is received in response to the first message, and wherein the second message indicates a DMRS parameter group associated with the UE.

9. The UE of claim 8, wherein the at least one processor is further configured to cause the UE to determine the at least one DMRS parameter from the DMRS parameter group.

10. The UE of claim 1, wherein the second message comprises group downlink control information (DCI) scrambled with a group radio network temporary identifier (RNTI), and wherein the group DCI schedules the subsequent uplink data transmission.

11. The UE of claim 10, wherein the group RNTI is as a same RNTI that is used for DCI scheduling a response message in response to the first message.

12. The UE of claim 10, wherein the group RNTI is determined based at least in part on an RNTI used for DCI scheduling a response message in response to the first message and an offset.

13. A network equipment (NE) for wireless communication, comprising:
    at least one memory; and
    at least one processor coupled with the at least one memory and configured to cause the NE to:
        receive a first message that indicates a subsequent uplink data transmission
        transmit, based at least in part on the first message, a second message that indicates a set of DMRS parameters, wherein the set of DMRS parameters is associated with respective user equipment (UEs) in a group of UEs, and wherein a same resource associated with the group of UEs is used to receive one or more respective uplink transmissions comprising the first message; and
        receive, based at least in part on at least one DMRS parameter of the set of DMRS parameters, the subsequent uplink data transmission.

14. The NE of claim 13, wherein the first message comprises a preamble and physical uplink shared channel (PUSCH) transmission.

15. The NE of claim 13, wherein the second message is transmitted in response to the first message, and wherein the second message indicates the at least one DMRS parameter based at least in part on a relative position of a response signal in the second message.

16. The NE of claim 13, wherein the second message is transmitted in response to the first message, and wherein the second message comprises a response signal indicating the at least one DMRS parameter.

17. The NE of claim 13, wherein the second message comprises downlink control information (DCI) scheduling the subsequent uplink data transmission, and wherein the DCI indicates the at least one DMRS parameter.

18. The NE of claim 13, wherein the second message is transmitted in response to the first message, and wherein the second message indicates a DMRS parameter group associated with at least one UE in the group of UEs.

19. A method performed by a user equipment (UE), comprising:
   transmitting first message that indicates a subsequent uplink data transmission;
   receiving, based at least in part on the first message, a second message that indicates a set of demodulation reference signal (DMRS) parameters, wherein the set of DMRS parameters is associated with respective UEs in a group of UEs comprising the UE, and wherein a same resource associated with the group of UEs is used for one or more respective uplink transmissions comprising the first message; and
   transmit, based at least in part on at least one DMRS parameter of the set of DMRS parameters, the subsequent uplink data transmission.

20. A processor for wireless communication, comprising:
   at least one controller coupled with at least one memory and configured to cause the processor to:
      transmit a first message that indicates a subsequent uplink data transmission;
      receive, based at least in part on the first message, a second message that indicates a set of demodulation reference signal (DMRS) parameters, wherein the set of DMRS parameters is associated with respective UEs in a group of UEs, and wherein a same resource associated with the group of UEs is used for one or more respective uplink transmissions comprising the first message; and
      transmit, based at least in part on at least one DMRS parameter of the set of DMRS parameters, the subsequent uplink data transmission.

* * * * *